United States Patent
Sackl et al.

(10) Patent No.: US 9,369,031 B2
(45) Date of Patent: Jun. 14, 2016

(54) ELECTROMAGNETIC ACTUATOR WITH ENCLOSURE SLEEVE SURROUNDING ARMATURE AND AT LEAST ONE PERMANENT MAGNET

(71) Applicant: Kendrion (Villingen) GmbH, Villingen-Schwenningen (DE)

(72) Inventors: Robert Sackl, Deutschlandberg (AT); Joachim Fluehs, Villingen-Schwenningen (DE)

(73) Assignee: Kendrion (Villingen) GmbH, Villingen-Schwenningen (DE)

( * ) Notice: Subject to any disclaimer, the term of this patent is extended or adjusted under 35 U.S.C. 154(b) by 0 days.

(21) Appl. No.: 14/186,827

(22) Filed: Feb. 21, 2014

(65) Prior Publication Data

US 2014/0313000 A1 Oct. 23, 2014

(30) Foreign Application Priority Data

Apr. 17, 2013 (DE) .......................... 10 2013 206 897

(51) Int. Cl.
*H01F 7/00* (2006.01)
*H02K 33/00* (2006.01)
*H01F 7/08* (2006.01)
*H01F 7/16* (2006.01)

(52) U.S. Cl.
CPC ................ *H02K 33/00* (2013.01); *H01F 7/081* (2013.01); *H01F 7/1615* (2013.01); *H01F 2007/086* (2013.01); *H01F 2007/1692* (2013.01)

(58) Field of Classification Search
CPC ....... H02K 33/00; H02K 33/16; H02K 33/06; H01F 7/081; H01F 7/1615; H01F 2007/086; H01F 2007/1692

USPC ........................ 335/220–229, 249, 261, 279; 251/129.01–129.21
See application file for complete search history.

(56) References Cited

U.S. PATENT DOCUMENTS

| | | | | |
|---|---|---|---|---|
| 3,809,123 A | * | 5/1974 | Heimann | .............. F16K 31/082 137/625.5 |
| 4,129,187 A | * | 12/1978 | Wengryn | ............... H02K 33/00 173/117 |
| 4,660,010 A | * | 4/1987 | Burton | .......................... 335/228 |
| 4,714,300 A | * | 12/1987 | Heess | ..................... B60T 8/268 303/113.2 |
| 5,257,014 A | | 10/1993 | Zimmermann | |
| 5,434,549 A | | 7/1995 | Hirabayashi et al. | |
| 6,615,780 B1 | * | 9/2003 | Lin et al. | ..................... 123/90.17 |
| 6,670,875 B2 | * | 12/2003 | Bircann et al. | ................ 335/220 |
| 2001/0032633 A1 | | 10/2001 | Bircann et al. | |

FOREIGN PATENT DOCUMENTS

| | | |
|---|---|---|
| DE | 2102248 A | 8/1972 |
| DE | 3309904 A1 | 9/1984 |
| DE | 20 2011 107195 U1 | 10/2011 |
| JP | H07-274 468 A | 3/1994 |
| JP | H08-116 658 A | 10/1994 |

* cited by examiner

*Primary Examiner* — Bernard Rojas
(74) *Attorney, Agent, or Firm* — Juneau & Mitchell

(57) ABSTRACT

The invention relates to an electromagnetic actuator having a magnetically soft housing with at least two field coils which are distanced from each other axially, and an armature which is mounted in the housing concentrically to the field coils and which can slide axially, wherein the armature has at least one permanent magnet ring which encloses the armature radially. According to the invention, a non-magnetic sleeve is included which, together with the permanent magnet ring, radially surrounds the armature.

10 Claims, 1 Drawing Sheet

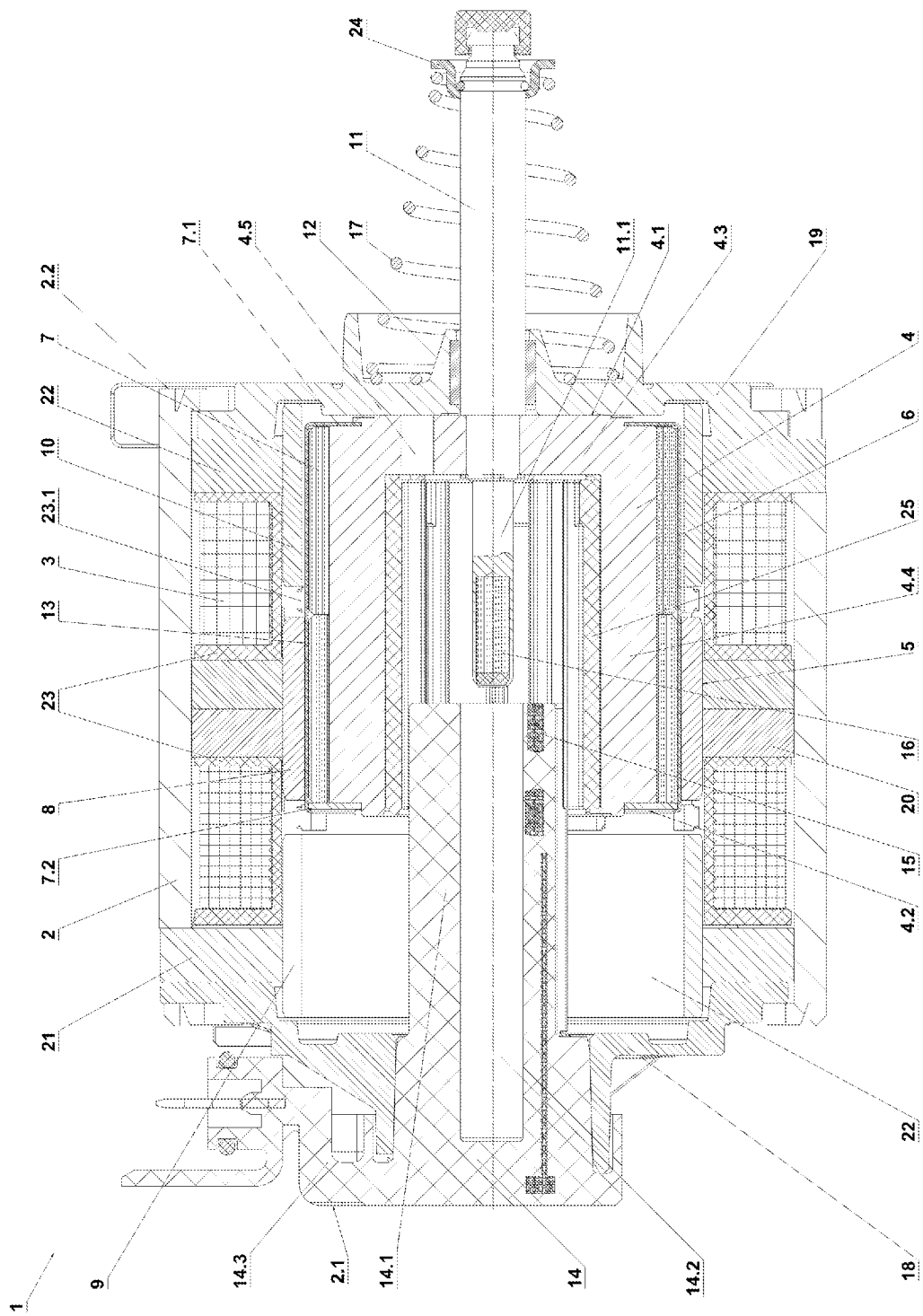

ELECTROMAGNETIC ACTUATOR WITH ENCLOSURE SLEEVE SURROUNDING ARMATURE AND AT LEAST ONE PERMANENT MAGNET

CROSS REFERENCE TO RELATED APPLICATIONS

This patent application claims priority German Patent Application 10 2013 206 897.2, filed on Apr. 17, 2013.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention
The invention relates to an electromagnetic actuator.
2. Background of the Invention
The current state of knowledge is as follows.
An electromagnetic actuator which defines the class is known from DE 11 2006 002 553 T5. This actuator comprises a stator housing with an armature which is constructed of a magnetically soft core and permanent magnet rings which surround the same radially, wherein these permanent magnet rings are arranged about the core of the armature with opposite magnetic polarity with respect to each other. The stator housing has multiple axially-spaced field coils which are functionally assigned to the permanent magnet rings and are arranged concentrically to the same, and which are connected in opposing polarity. When current is fed to the field coils, the armature moves in the axial direction of the stator housing, and the movement direction depends on the direction of current flow.

To manufacture such an armature, the permanent magnet rings are glued onto the armature. The difficult, and particularly unclean, manipulation of the glue is a disadvantage. As such, by way of example, excess glue must be scraped off, and in the process the danger exists that the excess glue can migrate to other parts of the actuator in an undesired manner.

In addition, it has been found that during operation of such an actuator, the danger exists that the armature can became tilted against the inner walls which form the armature space, when the armature is moved. In addition, it cannot be ruled out that the brittleness of the material of the permanent magnet rings used leads to wear on the inner walls of the armature space, or even to a break in the permanent magnets.

For this reason, the problem addressed by the invention is that of providing an electromagnetic actuator of the type named above, having improved properties, wherein the named disadvantages are particularly avoided.

BRIEF SUMMARY OF THE INVENTION

In a preferred embodiment, an electromagnetic actuator, comprising (a) a magnetically soft housing having at least two field coils which are distanced from each other axially, (b) an armature which is mounted in the housing concentrically to the field coils and which can slide axially, wherein the armature has at least one permanent magnet ring which encloses the same radially, and (c) a non-magnetic sleeve, which, together with the at least one permanent magnet ring surrounds the armature radially and in a positive-fitting manner.

In another preferred embodiment, the electromagnetic actuator as described, wherein the non-metallic sleeve has a thin-walled design.

In another preferred embodiment, the electromagnetic actuator as described, wherein the non-metallic sleeve is connected via the end face thereof to each of the end faces of the armatures by means of press fitting, swaging, or crimping.

In another preferred embodiment, the electromagnetic actuator as described, further comprising wherein a magnetically soft bearing tube is included for the purpose of guiding the armature, and is arranged concentrically to the field coils in the housing.

In another preferred embodiment, the electromagnetic actuator as described, wherein the at least one non-magnetic guide tube is included which connects axially to the bearing tube for guiding the armature.

In another preferred embodiment, the electromagnetic actuator as described, wherein the armature is mounted in the housing in a manner allowing sliding by means of an axle in a first end-face bearing of the housing, and by means of the bearing tube as the second bearing.

In another preferred embodiment, the electromagnetic actuator as described, wherein the armature has a cup-shaped design with a base part and a hollow cylindrical segment, and the axle is centrally mounted in the base part in a torque-proof manner.

In another preferred embodiment, the electromagnetic actuator as described, wherein (a) the housing, on the end face thereof, which is oriented toward the hollow cylinder segment of the armature, has a hollow cylindrical housing attachment which is arranged centrally thereon, and which projects at least partially into the hollow cylinder segment of the armature, said housing attachment having at least one sensor, and (b) the axle is designed with an axle segment which projects into the hollow cylinder segment of the armature for the purpose of receiving at least one sensor actuating element, which projects at least partially into the hollow cylindrical housing attachment when the armature moves.

In another preferred embodiment, the electromagnetic actuator as described, wherein the armature is pre-tensioned in a position by means of a spring element.

In another preferred embodiment, the electromagnetic actuator as described, wherein the spring element is arranged on the end face of the housing which supports the first bearing.

In another preferred embodiment, the electromagnetic actuator as described, further comprising wherein at least two permanent magnet rings are arranged in a positive fitting manner on the armature.

BRIEF DESCRIPTION OF THE DRAWINGS

FIG. 1 is a line drawing evidencing a cutaway illustration of an electromagnetic actuator according to one embodiment of the invention.

DETAILED DESCRIPTION OF THE INVENTION

The present invention is an electromagnetic actuator, which has a magnetically soft housing with at least two field coils which are spaced axially from each other, and an armature which is mounted in the housing concentrically to the field coils and is able to slide axially, wherein the armature has at least one permanent magnet ring which radially surrounds the armature, is characterized according to the invention in that a non-magnetic sleeve is included which surrounds the armature, along with the at least one permanent magnet ring, in a positive-fitting manner, radially, and preferably also axially.

As a result of the enclosure of the armature together with the at least one permanent magnet right, the same is protected from wear or impacts because the sleeve which constitutes the enclosure offers a large gliding surface by means of its external peripheral surface, and particularly in the case of multiple permanent magnet rings arranged on the armature, this is also not interrupted. As a result of this embedding by means of the sleeve, the gluing of the permanent magnet rings to the armature is dispensed with, thereby substantially simplifying the overall assembly of the electromagnetic actuator. This is because the assembly process only consists of placing the permanent magnet rings into this sleeve before inserting the armature into this sleeve and connecting the same preferably by means of a swaging. This sleeve according to the invention preferably has a thin-walled design, wherein as a result only a slight amount of additional constructed space and air gap is necessary.

A further advantage is that, in the event of a break of the sensitive permanent magnet rings, no negative effects occur on the function of the electromagnetic actuator, because the enclosure according to the invention prevents the permanent magnet rings from falling apart.

Finally, as a result of this enclosure of the armature which carries at least one permanent magnet ring, the armature is also protected from contamination, particularly metallic particles.

In one advantageous embodiment of the invention, the enclosure of the armature which has at least one permanent magnet ring is produced by connecting the sleeve on the end face thereof to each of the end faces of the armature, by means of press fitting, swaging, or crimping. This can be achieved, by way of example, in that an edge of the sleeve which projects beyond the end face of the armature is beveled to this end face. In this way, a simple and safe assembly process results for the production of such an armature.

In addition, according to one embodiment of the invention, for the guidance of the armature, a magnetic bearing tube is configured with a thin non-magnetic surface coating, said bearing tube being arranged in the housing concentrically to the field coils. As such, a substantially improved guidance behavior of the armature is achieved, because the same is no longer guided only by one axle, and therefore the risk of the armature becoming tilted is also reduced. In order to improve the gliding surface properties, the inner peripheral surface of this bearing tube can be configured with a glide layer, particularly a suitable plastic coating.

In a further embodiment of the invention, the armature is mounted in the housing in a manner allowing sliding by means of an axle in a first end-face bearing of the housing, and by means of the bearing tube as the second bearing. As such, not only is an improved guidance behavior achieved by means of the bearing tube, with reduced risk of tilting, as a result of the embodiment of the second bearing. Also a very small tolerance chain therefore results between the first and the second bearing.

In addition, according to one embodiment of the invention, the armature has a cup-shaped design with a base part and a hollow cylinder segment, wherein the axle is mounted in the center of the base part in a torque-proof manner. As a result, additional construction space advantageously results inside this hollow cylinder segment.

As such, according to one implementation, the housing has a centrally arranged hollow cylindrical housing attachment with at least one sensor element (e.g. a Hall effect sensor) on the end face thereof which faces the hollow cylinder segment of the armature, said hollow cylindrical housing attachment at least partially projecting into the hollow cylinder segment of the armature, wherein the axle is designed for the purpose of receiving at least one sensor actuating element (e.g. a magnet) via an axle segment which projects into the hollow cylinder segment of the armature, wherein upon a movement of the armature, said axle segment at least partially projects into the hollow cylindrical housing attachment. As such, the position of the armature can be detected and controlled and/or regulated.

In addition, according to one preferred implementation of the invention, the armature is pretensioned in a position by means of a spring element; the spring element in this case is preferably arranged on the end face of the housing which supports the first bearing.

Finally, it is advantageous if multiple, and at least two, permanent magnet rings are arranged on the armature, whereby it is possible to enlarge the stroke length of the armature.

DETAILED DESCRIPTION OF THE FIGURES

FIG. 1 shows a cutaway illustration of an electromagnetic actuator 1 according to one embodiment of the invention.

This electromagnetic actuator 1 has a tubular housing 2 made of magnetically soft material, wherein the end faces 2.1 and 2.2 thereof are formed by a cover 18 and a cover 19. The housing 2 accommodates two field coils 3 with an annular design, the same being spaced axially by means of a ring plate 20, wherein a further ring plate 21 and/or 22 is arranged between each field coil 3 and cover 18 and/or 19.

A cylindrical armature space 23 is formed by the field coils 3 and the ring plates 20 to 22, for the purpose of receiving a cylindrical armature 4 which is able to slide in said armature space. This armature 4 has a cup-shaped design, with a base part 4.3 and a hollow cylinder segment 4.4, and is arranged centrally on an axle 11 over the base part.

4.3 in a torque-proof manner, wherein this axle 11 is mounted in a first bearing point 12 formed by the cover 19, in a manner allowing sliding.

Two permanent magnet rings 5 and 6 are arranged on this armature 4, with an axial length of each approximately corresponding to half of the axial length of the armature 4, such that these two permanent magnet rings 5 and 6 extend opposite each other over the entire length of the armature 4. These two permanent magnet rings 5 and 6 have opposite magnetization.

This armature 4 is arranged in a thin-walled sleeve 7 made of a non-magnetic material—for example of stainless steel—together with these two permanent magnet rings 5 and 6. For the manufacture of such an armature 4, this sleeve 7 has edge regions 7.1 and 7.2 which project past the end faces 4.1 and 4.2 of the armature 4, and which are beveled on these end faces 4.1 and 4.2 to form a press fit, and are swaged to the same.

In the arrangement shown, a bearing tube 8 is centrally arranged with respect to the axial length of the armature space 23, in the same 23, for the purpose of forming a second bearing 13 for the armature 4, such that the ring plate 20 is covered. As such, the external peripheral surface of the sleeve 7 is able to glide along the internal peripheral surface of this bearing tube 8, wherein this internal peripheral surface of the bearing tube 8 can be configured with a glide layer for the purpose of improving the gliding properties thereof. One guide tube 9 and 10 is arranged on each side of this bearing tube 8 for the purpose of guiding the armature 4, and these are spaced apart from the guide tube 8 [sic] by means of—for example—cams 23.1 which are connected to coil bodies 23 of the field coils 3, as assembly aids. The risk of the armature 4 becoming tilted is significantly reduced as a result of this position of the second bearing 13. Due to the position of the second bearing 13 formed by the bearing tube 8, a short tolerance chain to the first bearing 12 results.

By means of this embedding of the permanent magnet rings 5 and 6 into the sleeve 7, the same are protected from wear and impacts. In addition, the external peripheral surface of the sleeve 7 forms a large and uninterrupted gliding surface. Even in the event of a break in the sensitive permanent magnet rings 5 and 6, due to the surrounding housing implemented by means of the sleeve 7 it is not possible for the broken pieces to come apart, such that the functionality of the electromagnetic actuator 1 is still ensured. Finally, these permanent magnet rings 5 and 6 are protected from contamination—particularly by metallic particles—due to the surrounding housing.

Outside of the housing 2, a cone-shaped coil spring is arranged on the axle 11 as a spring element 17 which is supported on one side on a limit stop 24 arranged on one end of the axle 11, and on the other side on the cover 19. By means of this spring 17, the armature 4 is pretensioned in the direction of the cover 19. A conical coil spring 17 can also be equipped with a catch loop abutting the cover 19, which prevents the spring 17 from potentially falling down in the event of a break in the spiral spring 17.

In order to be able to dictate the position of the armature 4 inside the armature space 23, a sensor magnet system consisting of a sensor magnet 16 and a Hall effect sensor 15 is integrated into the electromagnetic actuator 1.

For the purpose of accommodating the sensor magnets 16, the axle 11 is designed with an axle segment 11.1 projecting into the hollow cylinder segment 4.4 of the armature 4. The sensor magnet 16 is arranged on the end of this axle segment 11.1. Multiple sensor magnets 16 can also be included. Circular magnets are used as the sensor magnets 16, thereby substantially simplifying the assembly because it is not necessary to take into account the orientation and positioning due to a possible risk of tilting or possible slanted positioning.

A housing attachment 14, as a plastic part, is arranged on the end face 2.1 of the housing 2, and has a hollow cylindrical housing attachment connector 14.1 with a cylindrical receiving space 14.2, said connector guided through the center of the cover 18, as well as a plug 14.3 which is located outside of the cover 18. The housing attachment connector 14.1 until approx. the axial center of the armature space 23 [sic], such that this housing attachment connector 14.1 at least partially projects into the hollow cylinder segment 4.4 of the armature 4 when the end face 4.1 of the armature 4 comes to rest on the cover 19. The Hall effect sensor 15 is arranged in the end-face region of this housing attachment connector 14.1.

A plastic sleeve 25 is configured in the hollow cylinder segment 4.4, lying against the interior peripheral surface thereof, between the armature 4 and the housing attachment connector 14.1, for the purpose of securing said armature against rotation. This plastic sleeve 25 has rods running in the axial direction which engage in goods [sic: grooves] of the housing attachment connector 14.1, said grooves having a corresponding design. Such a securement against rotation can also be realized by the insertion of a bolt which is fastened on one end in the cover 19, and is guided through a bore hole 4.5 of the base plate 4.3 of the armature 4 and projects into a corresponding bore hole in the housing attachment connector 14.1.

When current is fed to both of the field coils 3, the magnetic field generated as a result is coupled to the magnetic field generated by the two permanent magnets 5 and 6, and thereby a corresponding movement of the armature 4 results, wherein the direction of movement depends on the direction of current flow.

In the described embodiment according to FIG. 1, two permanent magnet rings 5 and 6 are used for the two field coils 3. Instead of these two permanent magnet rings 5 and 6, it is also possible for only one single permanent magnet ring to be used. In order to realize a large stroke of the armature 4, it is also possible to place multiple magnets made of such permanent magnet rings 5 and 6 in line one after the other.

LIST OF REFERENCE NUMBERS 1 electromagnetic actuator
2 housing
2.1 end face of the housing 2
2.2 end face of the housing 2
3 field coils
4 armature
4.1 end face of the armature 4
4.2 end face of the armature 4
4.3 base part of the armature 4
4.4 hollow cylinder segment of the armature 4
4.5 bore hole
5 permanent magnet ring
6 permanent magnet ring
7 sleeve
7.1 edge region of the sleeve 7
7.2 edge region of the sleeve 7
8 bearing tube
9 guide tube
10 guide tube
11 axle
11.1 axle segment
12 first bearing
13 second bearing
14 housing attachment
14.1 housing attachment connector
14.2 cylindrical receiving space of the housing attachment connector 14.1
14.3 housing attachment 14 plug
15 Hall effect sensor
16 magnetic sensor
17 spring element, coil spring
18 cover of the end face 2.1
19 cover of the end face 2.2
20 ring plate
21 ring plate
22 ring plate
23 coil body
23.1 cams of the coil body 23
24 limit stop
25 plastic sleeve The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. An electromagnetic actuator, comprising:
   (a) a magnetically soft housing having at least two field coils which are distanced from each other axially,
   (b) an armature which is mounted in the housing concentrically to the field coils, wherein at least one permanent magnet ring encloses the armature radially, wherein the armature is mounted in the housing in a manner allowing sliding by means of an axle in a first end-face bearing of the housing, and by means of a bearing tube as the second bearing, and
   (c) a non-magnetic sleeve, radially surrounding the at least one permanent magnet ring and the armature, holding the at least one permanent magnet ring in contact with the armature, and connected via the end face thereof to each of the end faces of the armature by means of press fitting, swaging or crimping, allowing the armature and the at least one permanent magnet ring to slide axially together.

2. The electromagnetic actuator of claim 1, wherein the non-metallic sleeve has a thin-walled design.

3. The electromagnetic actuator of claim 1, wherein the non-metallic sleeve is connected via the end face thereof to each of the end faces of the armature by means of press fitting, swaging, or crimping.

4. The electromagnetic actuator of claim 1, further comprising wherein a magnetically soft bearing tube is included for the purpose of guiding the armature, and is arranged concentrically to the field coils in the housing.

5. The electromagnetic actuator of claim 1, wherein the at least one non-magnetic guide tube is included which connects axially to a bearing tube for guiding the armature.

6. The electromagnetic actuator of claim 1, wherein the armature has a cup-shaped design with a base part and a hollow cylindrical segment, and the axle is centrally mounted in the base part in a torque-proof manner.

7. The electromagnetic actuator of claim 6, wherein
   (a) the housing, on the end face thereof, which is oriented toward the hollow cylinder segment of the armature, has a hollow cylindrical housing attachment which is arranged centrally thereon, and which projects at least partially into the hollow cylinder segment of the armature, said housing attachment having at least one sensor, and
   (b) the axle is designed with an axle segment which projects into the hollow cylinder segment of the armature for the purpose of receiving at least one sensor actuating element, which projects at least partially into the hollow cylindrical housing attachment when the armature moves.

8. The electromagnetic actuator of claim 1, wherein the armature is pre-tensioned in a position by means of a spring element.

9. The electromagnetic actuator of claim 8, wherein the spring element is arranged on the end face of the housing which supports a first bearing.

10. The electromagnetic actuator of claim 1, further comprising wherein at least two permanent magnet rings are arranged in a positive fitting manner on the armature.

* * * * *